US008111695B2

(12) United States Patent
Van Ewijk et al.

(10) Patent No.: US 8,111,695 B2
(45) Date of Patent: Feb. 7, 2012

(54) RESOURCE ADMISSION CONTROL FOR CUSTOMER TRIGGERED AND NETWORK TRIGGERED RESERVATION REQUESTS

(75) Inventors: Adrianus Johannes Van Ewijk, Ekeren (BE); Stefaan Jozef De Cnodder, Lille (BE)

(73) Assignee: Alcatel Lucent, Paris (FR)

( * ) Notice: Subject to any disclaimer, the term of this patent is extended or adjusted under 35 U.S.C. 154(b) by 429 days.

(21) Appl. No.: 11/612,184

(22) Filed: Dec. 18, 2006

(65) Prior Publication Data

US 2007/0147292 A1 Jun. 28, 2007

(30) Foreign Application Priority Data

Dec. 23, 2005 (EP) .................................... 05292809

(51) Int. Cl.
*H04L 12/28* (2006.01)
(52) U.S. Cl. ......................... 370/392; 709/251
(58) Field of Classification Search ................. 370/329, 370/447, 389, 401, 392; 709/251, 250
See application file for complete search history.

(56) References Cited

U.S. PATENT DOCUMENTS

| | | | | |
|---|---|---|---|---|
| 7,386,604 | B1 * | 6/2008 | Aoun et al. ................... | 709/220 |
| 2002/0194369 | A1 * | 12/2002 | Rawlins et al. ............... | 709/238 |
| 2003/0212830 | A1 * | 11/2003 | Greenblat et al. ............ | 709/251 |
| 2004/0010592 | A1 | 1/2004 | Carver | |
| 2004/0249927 | A1 * | 12/2004 | Pezutti .......................... | 709/223 |
| 2006/0028981 | A1 * | 2/2006 | Wright .......................... | 370/229 |
| 2007/0115962 | A1 * | 5/2007 | Mammoliti et al. .......... | 370/389 |

FOREIGN PATENT DOCUMENTS

EP 1 553 737 A1 7/2005

OTHER PUBLICATIONS

ETSI ES 282 003—1.6.6 Oct. 2005—NGN Functional Architecture; Resource and Admission Control Subsystem (RACS)—Release 1.

* cited by examiner

*Primary Examiner* — Dang Ton
*Assistant Examiner* — Wei Zhao
(74) *Attorney, Agent, or Firm* — Harness, Dickey & Pierce

(57) ABSTRACT

Customer triggered resource reservation requests (131) are granted or refused in an access node (104) on the basis of available resources on downlinks (102) between the access node (104) and customer premises, and eventually uplinks (105) between the access node (104) and an aggregation network (106). Network triggered resource reservation requests (121) are granted or refused in a central resource admission control device (108) on the basis of knowledge of available resources in the aggregation network (106) and the contents of an admission control report (123) received from the access node (104). The admission control report (123) is generated by the access node (104) on the basis of available resources on downlinks (102) between the access node (104) and customer premises, and eventually uplinks (105) between the access node (104) and an aggregation network (106). The access node (104) thus coordinates the granting and refusing of customer triggered resource reservation requests (131) and network triggered resource reservation requests (121) for the downlinks (102) and eventually the uplinks (105) extending from this access node (104).

17 Claims, 1 Drawing Sheet

RESOURCE ADMISSION CONTROL FOR CUSTOMER TRIGGERED AND NETWORK TRIGGERED RESERVATION REQUESTS

FIELD OF THE INVENTION

The present invention generally relates to admission control in access and aggregation networks for both customer triggered reservation requests, typically related to multicast services such as broadcast IPTV, and network triggered reservation requests, typically related to unicast services such as VoIP (Voice over IP), VoD (Video on Demand), video conferences, IMS (IP Multimedia Subsystem) conversational services, etc. The admission control is a function that grants (accepts) or refuses a reservation request for network resources required to setup a service.

BACKGROUND OF THE INVENTION

The demand for Quality of Service (QoS) and resource admission control (RAC) in access and aggregation networks is increasing with the emerging interest of network operators in triple play services, i.e. concurrent deployment of High Speed Internet (HSI) access, conversational point-to-point services such as VoIP or conversational IP multimedia services, and client-server based services such broadcast TV (BTV).

Multicast or broadcast applications like broadcast TV typically rely on a terminal or customer premises equipment (CPE) triggered mechanism to reserve resources in the access network. The end-user's set-top box (STB), PC or home gateway for instance uses the Internet Group Multicast Protocol (IGMP) to select a TV channel or to zap between TV channels, thereby requesting reservation of the necessary resources in the access network to deliver the TV channel. Note that different TV channels indeed may have different resource or Quality of Service (QoS) requirements in the access and aggregation network depending for instance on the definition (standard definition versus high-quality definition) or the availability of the channel in the access node versus a situation where the channel has to be retrieved from nodes deeper in the network. The access node, for instance the Digital Subscriber Line Access Multiplexer (DSLAM) in case of a DSL access network, terminates the IGMP messages received from the CPE and performs resource admission control on the basis of its knowledge of available resources on the DSL line towards the customer premises and the locally configured bandwidth profile for broadcast TV in the first mile. The admission control for services like broadcast TV must be done as closely as possible to the CPE, i.e. preferably in the access node, because the delay for zapping between channels must be as small as possible in order to achieve an acceptable user experience.

Conversational services such as VoIP, video conferencing and fixed IMS on the other hand typically use a network triggered resource reservation mechanism whereby application-proxies make the resource reservations in the network. Examples are a gaming server or an IP Multimedia Subsystem (IMS) that issues resource reservation requests from its Proxy-Call State Control Function (P-CSCF) to a central resource admission control subsystem somewhere in the aggregation network. Thereto, the IMS P-CSCF is equipped with a so called Gq interface, Gq' interface or ETSI Tispan interface as specified in the draft ETSI Specification ES 282 300 version 1.6.6, published in October 2005 under the title "*NGN Functional Architecture; Resource and Admission Control Subsystem (RACS); Release 1*". The central resource admission control subsystem typically is integrated in a separate device like a Session Resource Broker or SRB, but could also be integrated in the IMS. The application servers/proxies for unicast services like VoIP and VoD send resource reservation requests to this central resource admission control function. The latter is supposed to have a logical overview of the available resources in the aggregation network (and eventually on the access links). Based on its knowledge of these available resources, the central admission control function grants or refuses the requests from the application servers/proxies.

A problem with the existing solution based on central resource admission control for network triggered reservation requests is that the central RAC function does not know how the amount of bandwidth (or resources) that is dynamically reserved by the access nodes for CPE originating reservation requests. In case of broadcast TV deployment for instance, the central RAC function is only aware of the first time a subscriber switches on his set-top box to receive BTV (assuming that the video platform indicate to the central RAC function that BTV is active). Afterwards, the central RAC function is not informed on channel zapping by the customer although such channel changes may impact the availability of resources in the access and aggregation network. BTV channels may have different resource requirements (e.g. standard-definition versus high-definition BTV). Moreover, not all BTV channels may be available at the access node and consequently may need to be retrieved from nodes deeper in the aggregation network. The uplink interface of the access node may be congested and/or the downlinks from the access node to the customer premises may be congested. Since the central RAC function is unaware of the channel zapping, these congestion problems may remain invisible to the central RAC function that consequently may grant network triggered resource reservation requests for which insufficient resources are available.

Similarly, the access node that terminates the customer premises originating resource reservation requests for multicast applications is not aware of the amount of bandwidth that is allocated by the central RAC function for unicast applications. A consequence of this is that requests for multicast services could be accepted by the access node while there is insufficient bandwidth in the aggregation network to deliver the requested channel or service.

Currently no adequate solution exists that coordinates resource admission control for both network triggered resource reservation requests and terminal triggered resource reservation requests.

A straightforward way to coordinate admission control for both terminal and network triggered resource reservation requests would be network planning. Network planning implies that available bandwidth (or resources) on various network links is (are) partitioned into a bandwidth (or resource) budget for conversational services (IMS, VoIP, VoD) and a bandwidth (or resource) budget for multicast applications (BTV). This approach however is highly inefficient because bandwidth budgets that are dedicated to a certain type of service (e.g. BTV) cannot be used by other services. As a result of network planning, the capacity in the access and the aggregation network is rigidly segmented between the services that require QoS, such as BTV, VoD, VoIP and IMS services. For the DSL access links for instance a bandwidth budget will be reserved for VoIP (typically dimensioned to enable a few simultaneous VoIP or Video Telephony calls) and a separate bandwidth budget will be reserved for video services such as BTV and VoD (if assumed that the video budget may be shared between BTV and VoD).

As a consequence, voice and video traffic must not exceed their respective planned bandwidth budgets. This means that a dedicated portion of the capacity of the first mile is dedicated to BTV/VoD, which cannot be used for other services like VoIP or IMS. For a set-top box that can access BTV/VoD and IMS, the maximum bandwidth on the first mile of for instance 6 Mbps may be divided into 5 Mbps that will be available to BTV/VoD, while the remainder portion (1 Mbps) will be available to services like IMS. Obviously, other segmentations may exist as well. This division of the resources will be frozen. Network planning that segments the resources between video services and other services in such a way obviously results in inefficient resource usage. In particular when resource hungry conversational services will emerge (IMS, point-to-point video services, etc.), the network planning approach will no longer be adequate. Indeed, since IMS will be the future main system for conversational multimedia services and since IMS is not limited to VoIP only, the resource requirements for services that use network triggered reservation request mechanisms will increase dramatically.

As a conclusion, it is an objective of the present invention to provide a solution to the above explained drawbacks of handling CPE triggered resource reservation requests in access nodes, handling network triggered resource reservation requests in a central RAC device, and eventually using network planning to divide that resource budget in the access and aggregation network between the different types of services.

SUMMARY OF THE INVENTION

The drawbacks of the prior art solutions are overcome and the above defined objectives are realised through a network node with direct or indirect connectivity to customer premises via downlinks and connectivity to an aggregation network via one or more uplinks as defined by claim 1. The network node network an receive customer triggered resource reservation requests and has a resource admission control function for granting or refusing the customer triggered reservation requests. The network node further has means to receive network triggered reservation requests from a central resource admission control function in the aggregation network, and its resource admission control function is adapted to coordinate the granting or refusing of the customer triggered reservation requests with the granting or refusing of the network triggered reservation requests on the basis of at least its knowledge of available resources on the downlinks to the customer premises.

This way, a coordinated admission control model is realised whereby a network node in the access network makes admission control decisions for both CPE triggered and network triggered resource reservation requests as far as the first mile concerns. A central RAC function may still remain responsible for overall admission control decisions for network triggered resource reservation requests but it will base its decision no longer solely on its knowledge of the available resources in the aggregation network, but also on the first mile admission control decision issued by the access network node according to claim 1 of the current patent application.

The present invention further relates to a central admission control device able to interface with a network node according to the current invention as defined in claim 13, and to a method for handling customer triggered resource reservation requests and network triggered reservation requests through a network node and central admission control device according to the current invention as defined in claim 14.

An optional feature of the network node according to the present invention is that the granting or refusing of the customer triggered reservation requests and network triggered reservation requests may additionally take into account knowledge of available resources on the uplinks. This feature is defined by claim 2.

This way, the network node in the access network will be responsible for admission control decisions for the first mile and the uplink of the access node to the aggregation network. Alternatively, when the central RAC function has visibility on the uplink between access node and aggregation network, the knowledge of available resources on these uplink(s) may be taken into account by the central RAC function.

An implementation feature of the network node according to the present invention is that it may include a dedicated interface for connectivity with the central admission control function in the aggregation network, as defined by claim 3.

Thus, a new interface may be proposed between the central RAC device, e.g. the SRB, and the access node, e.g. the DSLAM, in order to facilitate exchanging network triggered resource admission control requests and related RAC decisions. The interface may eventually also enable the exchange of measurement reports between the access node and the central RAC function. Alternatively, the interface may be with nodes deeper in the network like for instance aggregation nodes.

A further optional feature of the present invention is that the customer triggered resource reservation requests may concern multicast services and the network triggered reservation requests may concern unicast services, as defined by claim 4.

Indeed, as already explained above, resource reservation requests for multicast services are likely to be issued by customer premises equipment and may have to be terminated in the access node for delay or latency reasons, whereas resource reservation requests for unicast or point-to-point conversational services are likely to issue from requesters in the network. The current invention however is not restricted to apply only to networks or deployments where all multicast related requests come from CPEs whereas all unicast related requests are network-originating.

Another optional feature of the network node according to the present invention is that its admission control function may be adapted to issue grants or refusals towards said customer premises for the customer triggered reservation requests, as defined by claim 5, and to issue grants or refusals via its dedicated interface towards the central admission control function for the network triggered reservation requests, as defined by claim 6.

Instead of explicit grants or refusals, one could however think of variant implementations of the network node according to the present invention which issue resource measurement reports or admission control reports towards the central admission control function, the latter being defined for instance in claim 7.

As indicated by claims 8 to 12, the network node according to the present invention can for instance be a Digital Subscriber Line Access Multiplexer (DSLAM), a Digital Loop Carrier (DLC), an Optical Fibre Aggregator, a Cable Modem Terminating System (CMTS), a Radio Network Control (RNC), a WIMAX access service network gateway (ASN-GW), or even an aggregating node in the aggregation section of the network.

DETAILED DESCRIPTION OF EMBODIMENT(s)

Figure 1:
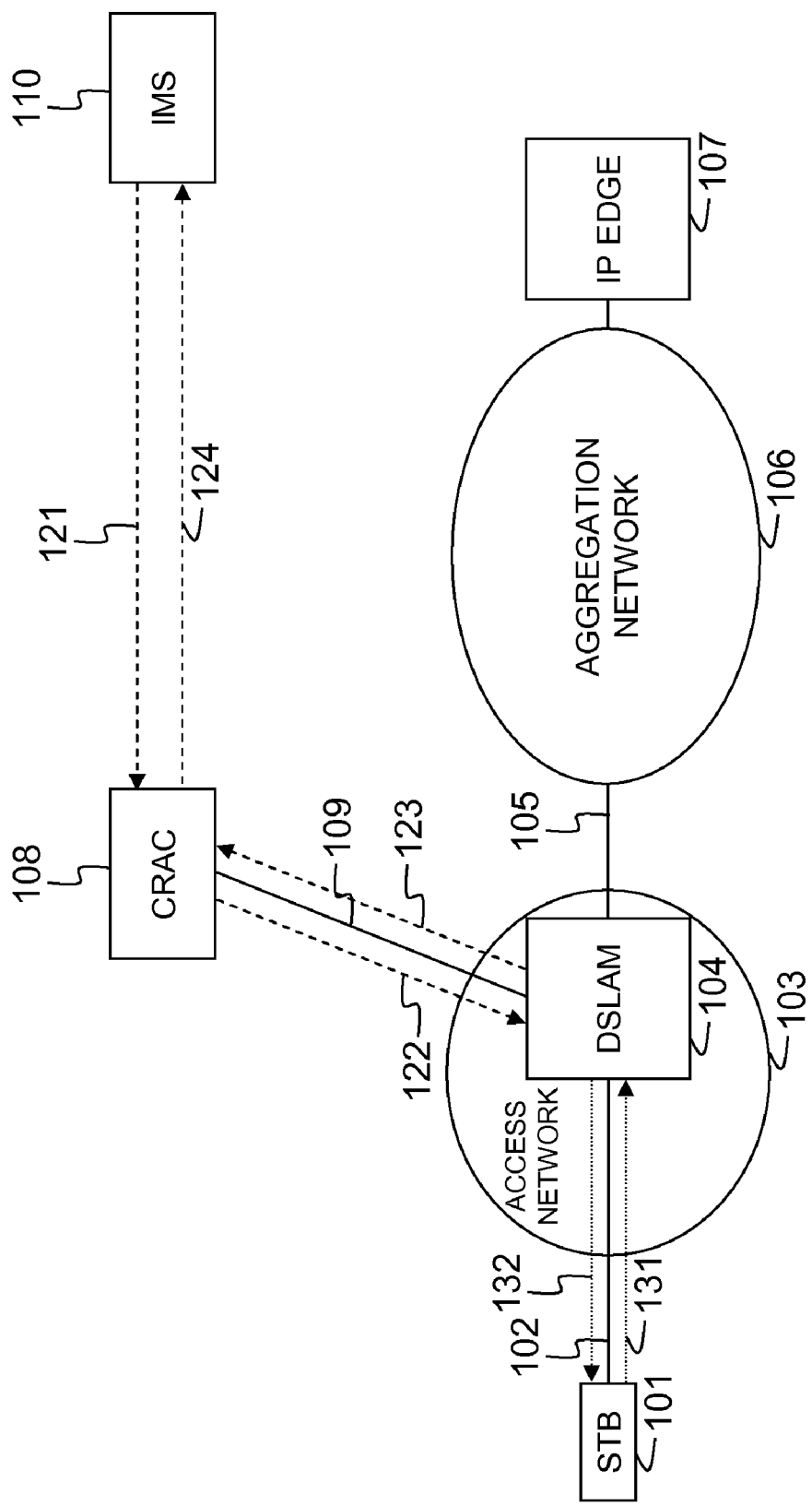
FIG. 1 illustrates a network with an embodiment of the network node according to the present invention and an embodiment of the central admission control device according to the present invention.

FIG. 1 shows a set-top box 101 at the customer premises. The set-top box 101 is connected to a Digital Subscriber Line Access Multiplexer 104 via an ADSL modem (not shown in FIG. 1) and a twisted copper pair 102 over which an ADSL or VDSL service is deployed. The copper pair 102 and the DSLAM 104 form part of the access network 103. Apart from the downlink 102, DSLAM 104 has an uplink 105 for connectivity to aggregation network 106. At the border of the aggregation network 106 and the core network (not drawn in FIG. 1) an IP edge router 107 is placed. FIG. 1 further shows a central resource admission control device 108 logically interconnected with DSLAM 104 through a dedicated interface or logical connection 109. The central resource admission control device 108 further logically interfaces with an IP multimedia subsystem 110.

The DSLAM 104 and the central resource admission control device 108 operate according to the present invention. This means that the DSLAM 104 is equipped with a resource admission control function for unicast and multicast flows for its downlinks (e.g. 102), and its uplinks (e.g. 105). The central resource admission control device 108 performs admission control for unicast flows in the aggregation network 106, and further has the ability to interface with DSLAM 104, the ability to request DSLAM 104 for admission/refusal of unicast flows for the access network 103 and the uplink 105 to the aggregation network 106, and the ability to take the information received from DSLAM 104 into account into the overall admission control for unicast flows.

The mechanisms followed for unicast and multicast resource admission control are illustrated in FIG. 1 through respectively the dashed and dotted arrows.

The IP Multimedia Subsystem 110 for instance issues a resource reservation request 121 for a VoIP call through its Proxy-Call State Control Function (P-CSCF), not drawn in FIG. 1. This resource reservation request 121 is received and interpreted by the central resource admission control device 108. The CRAC device 108 through its dedicated interface 109 sends a resource reservation request 122 to DSLAM 104 in order to request admission or refusal of the VoIP call for the access network 104 and uplink 105. The resource reservation request 122 may be a copy of the resource reservation request 121 received from the IMS 110, or could be a reformatted request basically demanding reservation of the necessary bandwidth for the VoIP call in the access network 104 and uplink 105. DSLAM 104 receives the request 122 on its dedicated interface according to the present invention, and interprets the request 122 in its resource admission control function. This resource admission control function has knowledge on the available resources (e.g. the available bandwidth) on the downlink(s) extending from DSLAM 104 towards the customer premises and the available resources on the uplink(s) towards the aggregation network 105. The resource admission control function in DSLAM 104 hence has a view on all resources occupied in the access network and on the uplink by both multicast services (for which requests are coming directly from the customer premises equipment like STB 101) and unicast services (for which requests are forwarded by the central resource admission control device 108). Based on this knowledge, the resource admission control function in DSLAM 104 determines if the VoIP call can be accepted or should be refused, and an admission/refusal report 123 is sent back to the central resource admission control device CRAC 108. This report 123 can contain an explicit admission or refusal of the VoIP call, or it can contain information on the measured available resources in the access network and uplink 105 enabling the CRAC device to take an admission or refusal decision. The CRAC device 108 combines the information in response 123 with its own knowledge of the available resources in the aggregation network 106 to issue a final admission/refusal response 124 towards IMS 110. Summarizing, the CRAC device 108 in other words outsources the admission control decision for the access link and uplink to the DSLAM 104 for the network triggered reservation requests, and includes the admission control decision of the DSLAM 104 into its own final decision 124 towards the network triggered resource reservation requestor, i.e. IMS 110 in FIG. 1.

For a multicast flow, e.g. a broadcast TV channel, the set-top box issues a resource reservation request 131 through for instance an IGMP message. This request 131 is terminated in the DSLAM 104, whose resource admission control function combines its knowledge of resources occupied on downlink 102 and uplink 105 by both multicast services and unicast services to take an admission/refusal decision. The DSLAM reports its decision to the set-top box 101 via response 132. Note that depending on the protocol used for the reservation request message 131, there may or may not be an explicit response (in the latter situation, there is only an explicit request). For example, in case of IGMP there is no explicit response but the video stream just starts towards the set-top box (STB receives the stream). For other protocols like RSVP there is an explicit response. The DSLAM 104 thus has a RAC function that makes resource admission control decisions for both CPE initiated reservation requests (like 131) and network initiated reservation requests (like 121) forwarded to the DSLAM 104 by a central RAC device 108 that intercepts such network initiated requests. The DSLAM 104 makes resource admission control decisions for both multicast and unicast flows for the first mile downlinks (like 102) and the uplinks to the aggregation network (like 105). The DSLAM 104 thereto is equipped with a special interface 109 to exchange QoS or resource reservation requests and decisions with the CRAC device 108.

The main advantage of the solution illustrated by FIG. 1 is that admission control on the first mile and the aggregation network is coordinated for both CPE triggered (typically for BTV) and network triggered (typically conversational services) resource reservation requests resulting in more efficient resource usage for multicast and unicast services.

In addition, there is no need to implement application signaling proxies in the DSLAM 104 (SIP, RTSP etc). These application proxies should make the DSLAM aware of applications that are used on the first mile that require network triggered resource reservation and allow the DSLAM 104 to perform resource admission control.

It is further noted that an application proxy that is positioned closely to DSLAM 104 (or even application proxies that are integrated with the DSLAM 104) may directly use the new interface 109 instead of first contacting the central resource admission control device 108 in case it receives QoS or resource reservation requests from the set-top box that are transparent to the complete access network.

Since resource admission control is already implemented on prior art DSLAMs for CPE triggered reservation, it will be possible for a person skilled in the art of telecom equipment without too much effort to create a new interface that can be used for network triggered reservation that relies on the resource admission control function already available in the DSLAM.

Although the present invention has been illustrated by reference to a specific embodiment drawn in FIG. 1, it will be apparent to those skilled in the art that various changes and modifications may be made within the spirit and scope of the invention. It is therefore contemplated to cover any and all modifications, variations or equivalents that fall within the spirit and scope of the basic underlying principles disclosed and claimed in this patent application. For example, the invention is not restricted to any architectural or implementation choices made in relation to FIG. 1. The set-top box could be replaced with any other piece of customer premises equipment like for instance a SIP phone, a PC, a terminal, a modem, a home gateway, etc. The DSLAM 104 could be replaced with any other type of access node, like for instance a cable modem termination system (CMTS), a digital loop carrier (DLC), an optical fibre aggregator, etc., provided that the last mile loop 102 and certain customer premises equipment like the modem are also adjusted thereto. The functionality according to the present invention integrated in the DSLAM 104 could even form part of network entities or nodes in the aggregation segment 106 of the network. The RAC function integrated in the DSLAM 104 according to the present invention could consider the available resources on the downlinks only, or on both the downlinks and uplinks. Should the function for instance be integrated in an aggregation node, it is likely that the function only considers the available resources on the downlinks for its admission/refusal decision, since the uplinks of such aggregation node form part of the aggregation network which is anyhow monitored by the central RAC function. It is however not excluded that the uplink of the aggregation node is considered by the function in case the central RAC is a null-function and does not make resource admission control decisions for the aggregation part itself. The IMS in FIG. 1 could be replaced with a VoD server, a gaming server, or other network entities that are able to issue reservation requests for unicast services. The CRAC device 108 could be a standalone entity like a Session Resource Broker (SRB) implementing the TISPAN Access Resource Admission Control Function (ARAC-F) or alternatively it could be integrated for instance with the P-CSCF of the IMS 110 into a single unit.

The invention claimed is:

1. A network node with direct or indirect connectivity to customer premises via at least one downlink and connectivity to an aggregation network via at least one uplink, the network node comprising:
a first interface configured to receive customer triggered reservation requests related to multicast services from the customer premises via the at least one downlink;
a second interface configured to receive network triggered reservation requests related to unicast services from the aggregation network; and
a resource admission controller configured to issue an admission control report for the network triggered reservation requests towards a central resource admission control device based on at least knowledge of available resources on the at least one downlink, the admission control report including information on available resources in the network node, the resource admission controller further configured to coordinate granting or refusing of the customer triggered reservation requests with the granting or refusing of the network triggered reservation requests based on the admission control report, the central admission control device including a network admission controller configured to grant or refuse the network triggered reservation requests based on the admission control report and at least knowledge of available resources in the aggregation network,
wherein the customer triggered reservation requests are related to broadcast television,
an amount of the available resources on the at least one downlink dynamically varies based on a type of the channels selected from the customer premises, and
the network triggered reservation requests are further related to at least one of Voice over Internet Protocol (VoIP), video conferencing and a fixed IP Multimedia Subsystem (IMS).

2. The network node according to claim 1, wherein the resource admission controller is further configured to coordinate the granting or refusing of the customer triggered reservation requests with the granting or refusing of the network triggered reservation requests based on knowledge of available resources on the at least one uplink.

3. The network node according to claim 1, wherein the second interface is a dedicated interface for connectivity with the central admission controller logically interconnected with the aggregation network.

4. The network node according to claim 1, wherein the resource admission controller is further configured to issue grants or refusals towards the customer premises for the customer triggered reservation requests.

5. The network node according to claim 3, wherein the resource admission controller is further configure to issue grants or refusals via the dedicated interface towards the central admission controller for the network triggered reservation requests.

6. The network node according to claim 3, wherein the resource admission controller is further configured to issue an admission control report via the dedicated interface towards the central admission controller for the network triggered reservation requests.

7. The network node according to claim 1, wherein the network node is a Digital Subscriber Line Access Multiplexer (DSLAM).

8. The network node according to claim 1, wherein the network node is a Digital Loop Carrier (DLC).

9. The network node according to claim 1, wherein the network node is an Optical Fibre Aggregator.

10. The network node according to claim 1, wherein the network node is a Cable Modem Terminating System (CMTS).

11. The network node according to claim 1, wherein the network node is an aggregating node.

12. A network comprising:
a central resource admission control device; and
a network node with direct or indirect connectivity to customer premises via at least one downlink and connectivity to an aggregation network via at least one uplink, the network node including a first interface configured to receive customer triggered reservation requests related to multicast services from the customer premises via the at least one downlink;
a second interface configured to receive network triggered reservation requests related to unicast services from the aggregation network; and
a resource admission controller configured to issue an admission control report for the network triggered reservation requests towards the central resource admission control device based on at least knowledge of available resources on the at least one downlink, the admission control report including information on available resources in the network node, the resource admission controller further configured to coordinate granting or refusing of the customer triggered reservation requests with the granting or refusing of the network triggered reservation requests based on the admission control report, wherein the central resource admission control device includes, a first interface configured to receive the network triggered resource reservation requests; and a second interface configured to forward the network triggered resource reservation requests to the network node and configured to receive from the network node the admission control report for the network triggered reservation requests; and a network admission controller configured to grant or refuse the network triggered reservation requests based on the admission control report and at least knowledge of available resources in the aggregation network.

13. The network node according to claim 1, wherein, the customer triggered reservation requests are triggered by the customer premises through at least one of a set-top box (STB), Personal Computer (PC) and home gateway, and the network triggered reservation requests are triggered through at least one of an application server and application proxy.

14. The network node according to claim 13, wherein the network node is located close to the customer premises.

15. The network node according to claim 1, wherein, the customer triggered reservation requests are triggered by the customer premises through at least one of a set-top box (STB), Personal Computer (PC) and home gateway, and the network triggered reservation requests are triggered through at least one of an application server and application proxy.

16. The network node according to claim 1, wherein the network node is located close to the customer premises.

17. The network node according to claim 16, wherein, the customer triggered reservation requests are triggered by the customer premises through at least one of a set-top box (STB), Personal Computer (PC) and home gateway, and the network triggered reservation requests are triggered through at least one an application server and application proxy.

* * * * *